United States Patent
Umasuthan et al.

(10) Patent No.: US 12,348,604 B2
(45) Date of Patent: Jul. 1, 2025

(54) SYSTEM AND METHOD FOR CONFIGURING MULTIPLE PTP PORTS OF A NETWORK DEVICE

(71) Applicant: Siemens Canada Limited, Oakville (CA)

(72) Inventors: Vivekanandan Umasuthan, Newmarket (CA); Vignesh Shanmugam, Brampton (CA); Michael Pustylnik, Toronto (CA)

(73) Assignee: Siemens Canada Limited, Oakville (CA)

( * ) Notice: Subject to any disclaimer, the term of this patent is extended or adjusted under 35 U.S.C. 154(b) by 738 days.

(21) Appl. No.: 17/412,053

(22) Filed: Aug. 25, 2021

(65) Prior Publication Data

US 2023/0065686 A1  Mar. 2, 2023

(51) Int. Cl.
*H04L 7/00* (2006.01)
*H04L 41/0803* (2022.01)

(52) U.S. Cl.
CPC ........ *H04L 7/0008* (2013.01); *H04L 41/0803* (2013.01)

(58) Field of Classification Search
CPC ............... H04L 7/0008; H04L 41/0803; H04L 41/0893; H04L 41/0806; H04J 3/0667
USPC ....................................................... 370/503
See application file for complete search history.

(56) References Cited

U.S. PATENT DOCUMENTS

| | | | |
|---|---|---|---|
| 8,630,314 B2 | 1/2014 | York | |
| 8,879,552 B2 | 11/2014 | Zheng et al. | |
| 10,348,429 B2 | 7/2019 | Galea et al. | |
| 2013/0336117 A1* | 12/2013 | Yan | H04J 3/0667 370/235 |
| 2015/0222413 A1* | 8/2015 | Pietilainen | H04J 3/0667 709/248 |
| 2015/0318941 A1 | 11/2015 | Zheng et al. | |
| 2016/0277138 A1* | 9/2016 | Garg | H04J 3/0641 |

(Continued)

FOREIGN PATENT DOCUMENTS

| | | |
|---|---|---|
| CN | 103067113 | 4/2013 |
| WO | 2017130034 | 8/2017 |

OTHER PUBLICATIONS www.networkacademy.ioccnaehternetforwarding-data-between-vlans. downloaded Aug. 7, 2021, 3 pages.

(Continued)

*Primary Examiner* — Kwang B Yao
*Assistant Examiner* — Syed M Bokhari (57) ABSTRACT

There is described a system and method for configuring multiple PTP ports of a network device comprising an input component and a processor. A PTP port group, associated with a subset of PTP ports of the network device and with a PTP region, is identified. A PTP parameter set corresponding to the PTP port group is received and applied to each port of the subset of PTP ports associated with the PTP port group. A time exchange is performed for PTP capable devices within the PTP region. There is also described a PTP network device comprising a first transparent clock, a second transparent clock, and a boundary clock. The first transparent clock performs time exchange within the first PTP region. The second transparent clock performs time exchange within the second PTP region. The boundary clock performs time exchange between the first and second PTP regions.

12 Claims, 6 Drawing Sheets

(56) References Cited

U.S. PATENT DOCUMENTS

| | | |
|---|---|---|
| 2020/0127752 A1* | 4/2020 | Tai .................... H04J 3/0667 |
| 2020/0329441 A1 | 10/2020 | Ha et al. |
| 2021/0028876 A1 | 1/2021 | Beardsley et al. |
| 2021/0152267 A1 | 5/2021 | Chan et al. |
| 2021/0266085 A1* | 8/2021 | Evans ................ H04J 3/0667 |
| 2023/0155709 A1* | 5/2023 | Speicher .............. H04J 3/12 |
| | | 370/503 |
| 2023/0179313 A1* | 6/2023 | Wang ................ H04J 3/0667 |
| | | 370/503 |

OTHER PUBLICATIONS www.ccnablog.cominter-vlan-routing, downloaded Aug. 7, 2021, 9 pages.

\* cited by examiner

|  | First PTP Port Group (226) | Second PTP Port Group (228) | ... | nth PTP Port Group (230) |
|---|---|---|---|---|
| Ethernet Ports (202) | 1,3-4 | 5,7 | ... | 9,13,15 |
| Group Name (204) | PG1 | PG2 | ... | PGn |
| Domain Number (206) | 0 | 0 | ... | 2 |
| Transport Protocol (208) | Layer3 Multicast | Layer2 Multicast | ... | Layer2 Multicast |
| Path Delay Mechanism (210) | End-to-End | Peer-to-Peer | ... | Peer-to-Peer |
| VID (212) | 100 | 1 | ... | 25 |
| PTP Profile (214) | Default E2D Profile | Power Profile | ... | Custom |
| PTP Port Type (216) | Slave Only | Auto | ... | MasterOnly |
| Sync Interval (218) | 1s | 1s | ... | 5s |
| Announce Interval (220) | 1s | 1s | ... | 3s |
| Announce Receipt Timeout (222) | 3 | 3 | ... | 3 |
| Grand Master ID (224) | N/A | 2 | ... | N/A |

SYSTEM AND METHOD FOR CONFIGURING MULTIPLE PTP PORTS OF A NETWORK DEVICE

FIELD OF THE INVENTION

This application relates to the field of precision time protocol-capable network devices and, more particularly, to configuring multiple precision time protocol ports of a network device.

BACKGROUND

A precision time protocol ("PTP") network device could consist of multiple physical ports. The mode of each port is determined and configured based on its anticipated use. A PTP network device is likely to have several ports requiring the same set of configuration parameters. Conventional device setup models require configuring each port individually for a PTP network device having many ports, thus resulting in significant time and labor costs for configuring the device.

In addition, ports of a PTP network device may have different requirements for time exchange depending on the region each port is connected to. The IEEE 1588 standard defines a protocol that provides synchronization of clocks in a packet-based network. Several clock types are defined in the Standard including Ordinary Clock, Boundary Clock and Transparent Clock. The Boundary Clock is a mode in which a device expects to receive time as a PTP Slave on one port and serve time as a PTP Master to the rest of its PTP ports. In contrast, a Transparent Clock is expected to forward time information between its PTP ports. The IEEE C37.238-2011 standard and the IEC 61850-9-3 standard define the Power Profile and the Utility profile respectively, which allow a Boundary Clock to introduce time inaccuracy up to 200 ns while they allow a Transparent Clock to introduce time inaccuracy up to 50 ns.

In a multiport network device, several ports may be associated with the same PTP region while other ports may be associated with other different PTP regions. A PTP region is a network region where all PTP capable devices adhere to the same set of PTP parameters, otherwise known as a PTP profile. A multiport network device with a Transparent Clock function is capable of performing time exchange within a PTP region but not between PTP regions. A multiport device with a Boundary Clock function is capable of performing time exchange within and between PTP regions, but the Boundary Clock function would be used for all PTP ports regardless of whether the certain ports belong to the same region or different regions, even if the device was capable of Transparent Clock functionality. While the Transparent Clock is not intended for inter-region time exchange, the Boundary Clock is inefficient and may introduce higher time inaccuracies.

SUMMARY

In accordance with one or more embodiments of the disclosure, there is provided a configuration approach for a multiport PTP network device. This approach provides the flexibility to add, remove, or otherwise configure multiple ports of the network device with the same PTP parameters or profile. In addition, a single PTP network device may provide both a Boundary Clock function and a transparent Clock function compliant to the standards of these functions, even though the IEEE 1588 standard does not provision a combined Boundary Clock and Transparent Clock device ("BC-TC device"). The hybrid configuration of the PTP network device utilizes the Boundary Clock function for time exchange between PTP regions and the Transparent Clock function for time exchange between ports in the same PTP region. Accordingly, the approach allows for efficient operation of the multiport PTP network device minimizing any potential time inaccuracies.

The configuration approach associates physical PTP ports of the network device to one set of PTP configuration parameters through a PTP Port Group configuration. Several PTP ports may be configure efficiently at the same time, and PTP ports may be grouped in a flexible manner according to user needs. The configuration of PTP Ports becomes user-friendly, and errors that may occur due to configuration copies may be minimized. Ports that are not part of the PTP network do not need to be included as a part of any PTP configuration. The configuration approach also provides significant accuracy within regions by the Transparent Clock function and avoidance of unnecessary contributions of time inaccuracy by the Boundary Clock function.

One aspect is a system for configuring multiple PTP ports of a network device comprising an input component and a processor. The input component is configured to identify a PTP port group associated with a subset of PTP ports of the network device. The PTP port group being further associated with a PTP region. The processor is configured to receive a PTP parameter set corresponding to the PTP port group and apply the PTP parameter set to each port of the subset of PTP ports associated with the PTP port group and perform time exchange for PTP capable devices within the PTP region.

Another aspect is a method for configuring multiple PTP ports of a network device. A PTP port group associated with a subset of PTP ports of the network device is identified in which the PTP port group being further associated with a PTP region. A PTP parameter set corresponding to the PTP port group is received. The PTP parameter set is applied to each port of the subset of PTP ports associated with the PTP port group. A time exchange is performed for PTP capable devices within the PTP region.

Yet another aspect is a multiport precision time protocol ("PTP") network device comprising a first transparent clock, a second transparent clock, and a boundary clock. The first transparent clock of the network device is coupled to first devices of a first PTP region. The first transparent clock performs time exchange within the first PTP region. The second transparent clock of the network device is coupled to second devices of a second PTP region. The second transparent clock performs time exchange within the second PTP region. The boundary clock of the network device communicates with the first and second transparent clocks. The boundary clock performs time exchange between the first and second PTP regions.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Various technologies that pertain to systems and methods that facilitate configuration of a multiport precision time protocol ("PTP") network device will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The network device and method configures multiple ports for the same PTP parameters or profile and maintains flexibility to add, remove or independently configure ports based on an intended use. The device and method allow users to reduce the number of redundant configuration steps encountered when configuring each PTP port separately. For example, the configuration model may facilitate field deployment of products and may make PTP adoption easier for end users of the device and its associated PTP network.

Figure 1:
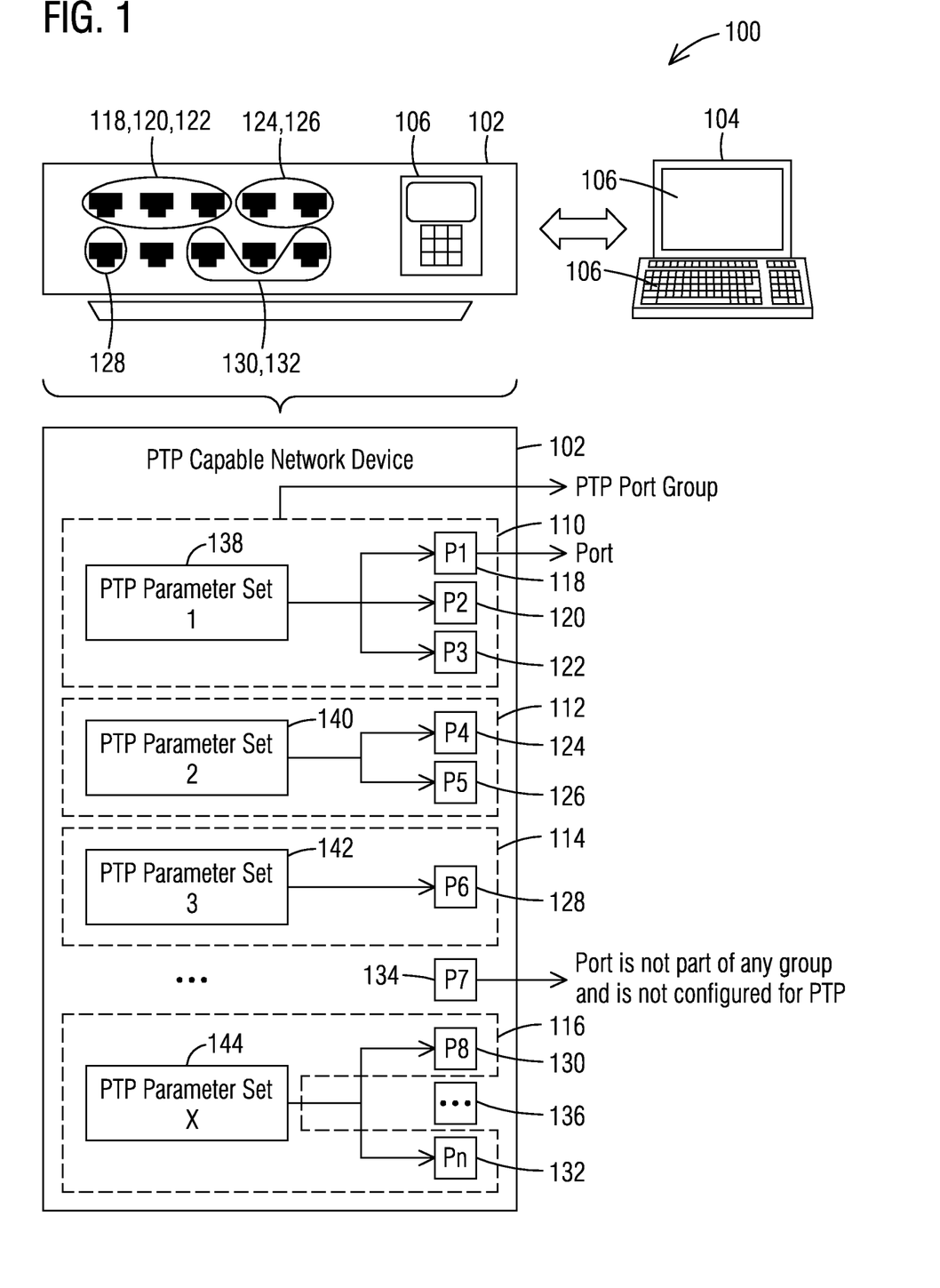
FIG. 1 is an illustration of a system in an example implementation that is operable to employ techniques described herein.

Referring to FIG. 1, there is shown a system 100 in an example implementation that is operable to employ techniques described herein. The system 100 includes a network device 102 and, for some embodiments, may also include a connected terminal 104. Examples of connected terminals 104 include any type of portable computing device capable of communication via a wired or wireless data link with the network device 102, such as, but are not limited to, a laptop computer, mobile device, tablet, remote terminal, server, and the like. An input component, such as a user interface 106, configures the network device 102 as explained below. The input component 106 may be supported by a connected terminal 104 for some embodiments and input component 106 may be supported by the network device 102 for other embodiments.

The network device 102 is PTP-capable and utilizes a configuration set of PTP port groups 110-116, to configure multiple PTP ports 118-132 of the network device. The network device 102 or the connected terminal 104 configures and maintains the parameters for multiple physical PTP ports 118-136 of the network device.

The input component identifies a PTP port group 110-116 associated with a subset of the PTP ports 118-132 of the network device 102, and each PTP port group is associated with a PTP region. The input component also identifies a PTP parameter set 138-144 of parameters to be assigned to each PTP port 118-132. For example, a first PTP port group 110 includes a first PTP parameter set 138 associated with each and every port of first PTP ports 118, 120, 122. Various embodiments may include one or more additional groups. For example, in addition to the first PTP port group 110, the network device 102 may include a second PTP port group 112 that includes a second PTP parameter set 140 associated with each and every port of second PTP ports 124, 126. For other embodiments, the network device 102 may further include a third PTP port group 114 that includes a third PTP parameter set 142 associated with a third PTP port 128, a fourth PTP port group 116 that includes a fourth PTP parameter set 144 associated with each and every port of fourth PTP ports 130, 132, and so forth. For some embodiments, the network device 102 may include one or more ports 134, 136 that are not part of any PTP port group. For some embodiments, the network device 102 may include one or more ports 134, 136 that are not configured for a PTP function.

The network device 102 and its PTP port groups 110-116 facilitate configuration of the PTP ports 118-132 by associating them with a PTP parameter set 138-144 at a similar time. For some embodiments, the PTP ports 118-132 may be associated simultaneously with a corresponding PTP parameter set 138-144. For some embodiments, the PTP ports 118-132 may be associated in series within a particular time period with a corresponding PTP parameter set 138-144. By this association, the PTP port group assign a group of ports to share the same set of PTP parameters. Examples of PTP port groups include, but are not limited to, PTP ports belonging to the same network segment or VLAN, PTP ports adhering to the same PTP profile (such as the PTP Power Profile or the PTP Utility Profile), PTP ports having restricted mode of operation (such as only-slave or only-master), and PTP ports requiring special processing (such as VLAN tag formatting, including or excluding particular TLV information in the PDU, etc.), Referring to FIG. 2, there is shown a PTP configuration table 200 representing example PTP parameter sets for multiple PTP port groups, which may be utilized by the system 100. For the example depicted by FIG. 2, PTP parameters 202-224 are represented by the rows, and PTP port groups 226-230 are represented by the columns. The PTP configuration table 200 may include PTP parameters 202-224 for one or more PTP port group 226-230. For the example table 200, each of the multiple PTP port groups 226-230 includes a port identification 202, group name 204, domain number 206, transport protocol 208, path delay mechanism 210, VID 212, PTP profile 214, PTP port type 216, sync interval 218, announce interval 220, announce receipt timeout 222, and a grand master identification 224. The port identification 202 represents the PTP ports associated with the corresponding PTP port group 226-230, and the group name 204 is a group identification of the corresponding PTP port group. For example, a first PTP parameter set 204-224 is assigned to each of ports 1, 3, and 4 for the PTP port group "PG1", and other PTP parameter sets for the other PTP port groups 228, 230 are assigned the correspond ports identified by the port identification 202. Each PTP parameter set corresponding to the corresponding PTP port group 226-230 includes at least one of the following primary parameters for each PTP port: a domain number 206, a transport protocol 208, a path delay mechanism 210, a PTP profile 214, a PTP port type 216, a sync interval 218, an announce interval 220, or an announce receipt timeout 224. For example, all primary parameters may be mandatory for the PTP port to operate so a PTP parameter set may include all of these primary parameters. Other secondary parameters 204, 212, 224 may be optional or may be needed dependent on the data of one or more primary parameters.

Figure 2:
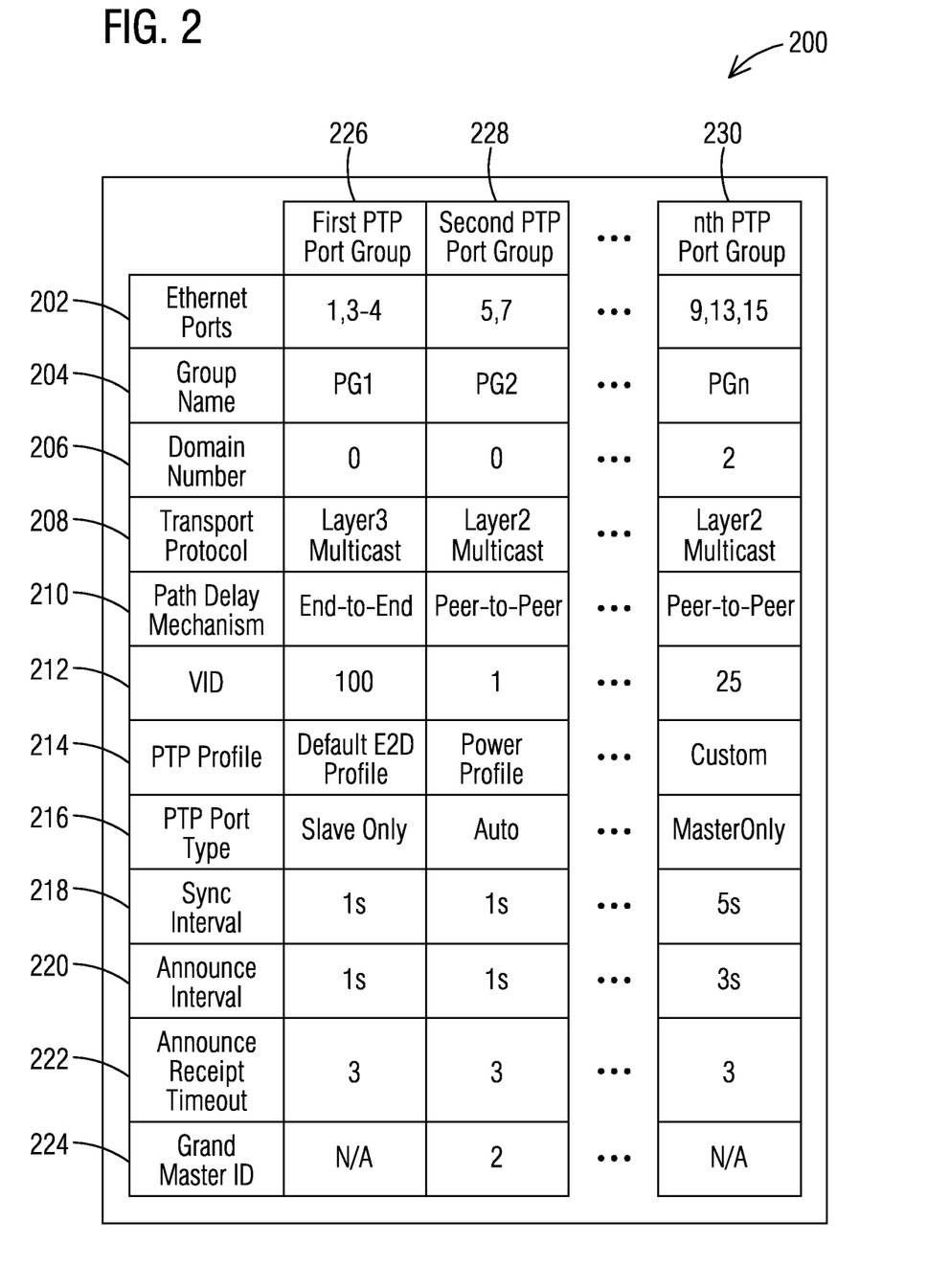
FIG. 2 is a PTP configuration table representing example PTP parameter sets for multiple PTP port groups, which may be utilized by the system of FIG. 1.

For some embodiments, the PTP configuration table 200 may also represent an example configuration interface for PTP Port Groups where each cell of the table is configurable. the configuration interface may include a single port group 226 and the PTP parameters 202-224 associated with the port group or multiple port groups 226-230 (as shown in FIG. 2) and the PTP parameters for each port group.

Figure 3:
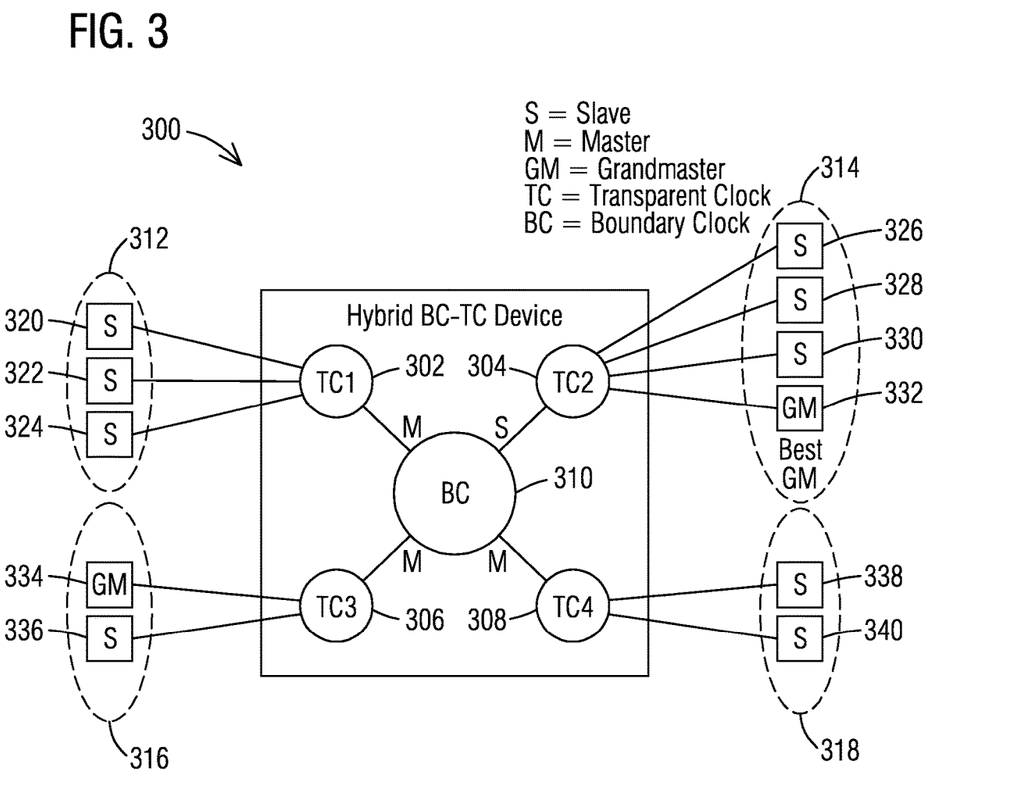
FIG. 3 is a schematic diagram of a hybrid BC-TC network device coupled to PTP capable devices of multiple PTP regions.

Referring to FIG. 3, there is shown a schematic diagram of a hybrid boundary clock-transparent clock ("BC-TC") network device 300 coupled to, or otherwise communicating with, PTP capable devices of multiple PTP regions. The hybrid BC-TC network device 300 includes multiple transparent clock ("TC") functions or components 302-308 and a boundary clock function or component 310 coupled to the TC components. Although four TC components 302-308 are shown in FIG. 3, it is to be understood that the network device 300 includes two or more TC components with the actual quantity based on varying embodiments. Each TC component 302-308 is associated with a corresponding PTP region 312-318. In particular, each TC component 302-308 is coupled to, or otherwise communicates with, corresponding PTP capable devices 320-340 of the corresponding PTP region 312-318. For example, the network device 300 includes a first TC component 302 communicating with first PTP capable devices 320-324 of a first PTP region 312, a second TC component 304 communicating with second PTP capable devices 326-332 of a second PTP region 314, and a BC component 310 communicating with the first and second TC components. For other embodiments, the network device 300 may include one or more additional TC components 306, 308 communicating with PTP capable devices 334-340 of other PTP regions 316, 318.

In order to combine the boundary clock role and the transparent clock role, the network device 300 includes a boundary clock function, a transparent clock function, and a configuration model for the PTP port groups (as described above). The network device 300 also includes a capability to act as a transparent clock component between ports of the PTP port group within the PTP region. The multiport PTP network device 300 comprises a first TC component ("TC1") 302 of the network device, a second TC component ("TC2") 304 of the network device, and a boundary clock ("BC") 310 of the network device. The first TC component 302 is coupled to the first devices 320-324 of the first PTP region 312 and performs time exchange with the first devices within the first PTP region. Likewise, the second TC component 304 is coupled to second devices 326-332 of the second PTP region 314 and performs time exchange with the second devices within the second PTP region. The boundary clock 310 communicates with the first and second TC components 302, 304 and performs time exchange with the first and second devices 320-332 between the first and second PTP regions 312, 314. The boundary clock 310 does not perform time exchange within the first or second PTP regions 312, 314. Also, neither the first TC component 302 nor the second TC component 304 performs time exchange with the first and second devices 320-332 between the first and second PTP regions 312, 314. Instead, the boundary clock 310 communicates directly with the first and second TC components 302, 304, and communicates indirectly with the first devices 320-324 and the second devices 326-332 via the first TC component and the second TC component, respectively.

The first devices 320-324 are associated with a first PTP port group, and the second devices 326-332 are associated with a second PTP port group. Examples of PTP port groups are represented by groups 226-230 of FIG. 2. The first TC component 302 performs time exchange with the first devices 320-324 of the first PTP port group within the first PTP region 312, and the second TC component performs time exchange with the second devices 326-332 of the second PTP port group within the second PTP region 314. Each TC component 302-308 forwards each message received from its associated PTP capable device unmodified, or substantially unmodified, to the other associated PTP capable device(s) coupled to its associated ports. The boundary clock 310 modifies some identification parameters of each message received from an original master source of one of the TC components 302-308 by replacing one or more of them with its own identification. Accordingly, the boundary clock 310 pretends to be a master source and behaves in accordance with a master clock profile. Each port within a PTP Port Group acts as a transparent clock port between other members of the PTP Port group. To the "central" boundary clock 310, each PTP port group appears as a boundary clock port.

A PTP network device 300 is coupled to multiple PTP capable devices 320-340 in which one of the PTP capable devices is the best grandmaster device and the other PTP capable devices sync their clocks to this grandmaster device. Where only one grandmaster device 332 of the multiple PTP capable devices 320-332 is coupled to the PTP network device 300, the one grandmaster device is selected to be the best grandmaster device. Where multiple grandmaster devices 332, 334 of the multiple PTP capable devices 320-340 are coupled to the PTP network device 300, the best grandmaster device is selected in accordance with the best master clock algorithm ("IEEE 1588 BMCA") for PTP distribution.

Master-slave clock signaling for the network device 300 occurs on the basis of the selected best grandmaster device. The boundary clock 310 is used to exchange time information between PTP port groups or PTP regions 312-318 while the TC component allows exchange of time information within the PTP port groups or PTP regions. Accordingly, the network device 300 allows lower time inaccuracy to be introduced within each PTP port group or PTP region. Slave devices attached to second TC component 304 will receive time from the local grandmaster 332 via the second TC component 302 while those attached to first TC component 304 will synchronize their time with the same grandmaster 332 via the boundary clock 310. Where the second devices 326-332 includes the best grandmaster device 332, the second TC component 304 communicates a slave signal to the boundary clock 310, and the boundary clock 310 communicates a master signal corresponding to the slave signal to the first TC component 302. As stated above, the message from the best grandmaster clock 332 is unmodified, or substantially unmodified, by the TC component 304 and the boundary clock 310 modifies some identification parameters of the message by replacing one or more of them with its own identification.

Figure 4:
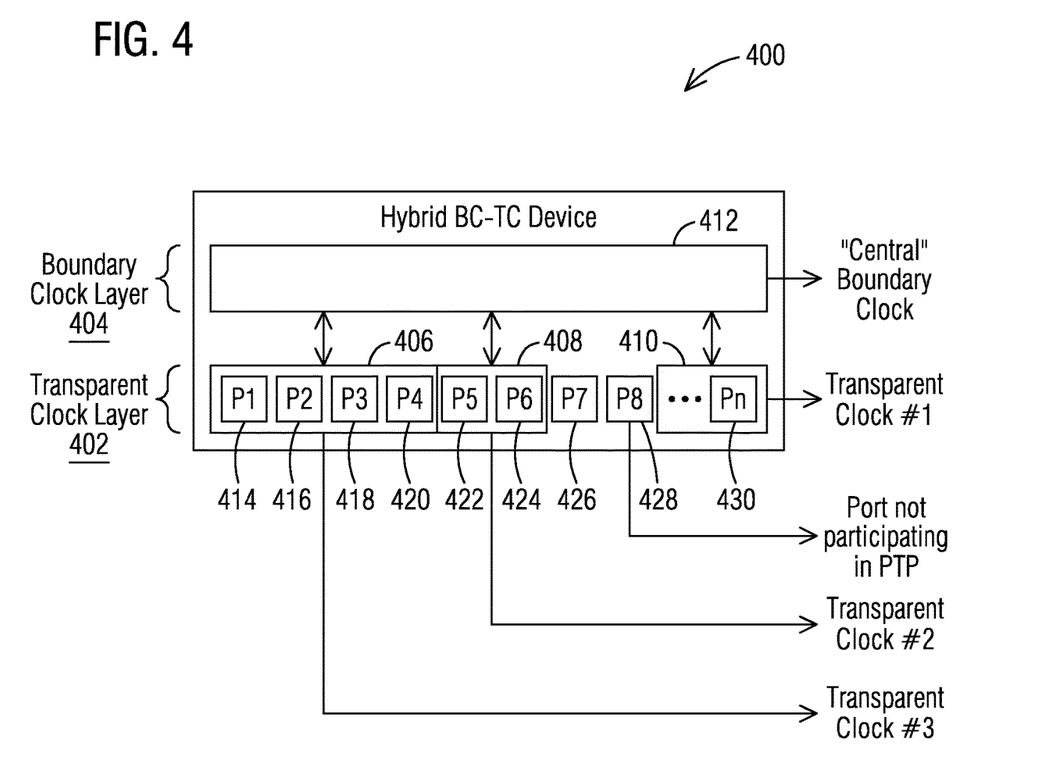
FIG. 4 is a block diagram representing layers of the hybrid BC-TC network device of FIG. 3.

FIG. 4 is a block diagram representing particular embodiments of the hybrid BC-TC network device 400 described above in reference to FIG. 3. As shown in FIG. 4, the network device 400 includes a transparent clock layer 402 and a boundary clock layer 404. The transparent clock layer 402 has multiple, autonomous transparent clock ("TC") components 406, 408, 410. The boundary clock layer 404 has a boundary clock ("BC") component 412 that interconnects, or otherwise communicates, with the aforementioned transparent clock layer 402 and its TC components 406-410 in the PTP context. Each TC component 406-410 is associated with a corresponding PTP port group and includes at least one port 414-430 coupled to a PTP capable device.

The boundary clock layer 404 communicates with the transparent clock layer 402 and performs time exchange with the PTP capable devices via the ports 414-430 of the TC components 406-410. Each TC component 406-410 of the transparent clock layer 402 performs time exchange with the PTP capable devices within its associated PTP region, and the boundary clock component 412 of the boundary clock layer 404 performs time exchange with the PTP capable devices between the PTP regions associated with different TC components 406-410 and PTP port groups. PTP messages received from a PTP capable device by the transparent clock layer 402 and its TC component 406-410 are forwarded unmodified, or substantially unmodified, to the other associated PTP capable device(s) and the boundary clock layer 404 and its BC component 412. PTP messages received from the transparent clock layer 402 by the Boundary clock layer 404 are modified by the BC component 412 of the boundary clock layer 404 and transmitted to the TC components of other PTP regions and PTP port groups. The BC component 412 may change one or more identification parameters of each PTP message and behave as a master clock source.

Figure 5:
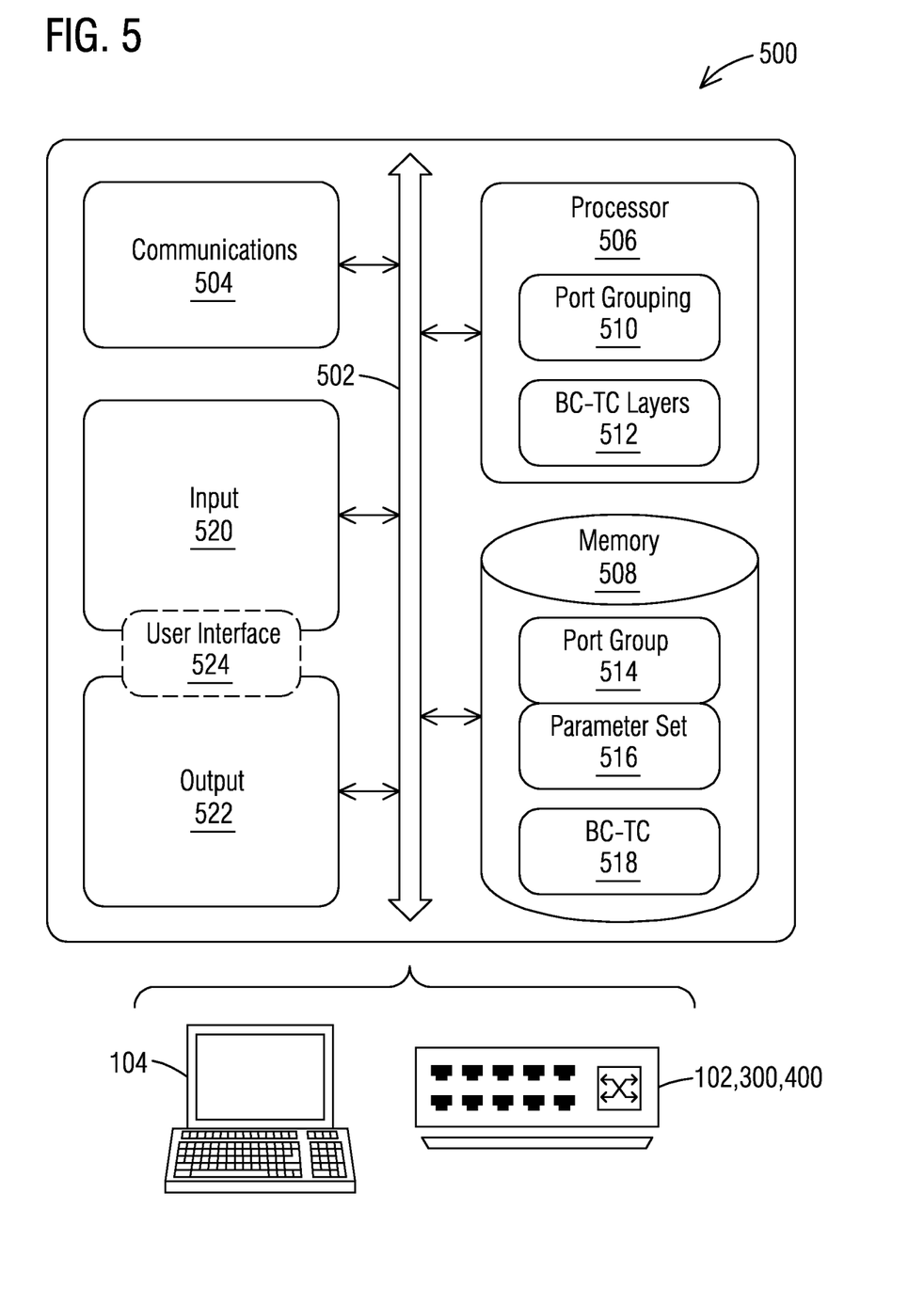
FIG. 5 is a block diagram of example device components of a connected terminal of FIG. 1 or the network device of FIGS. 1, 3, and 4.

FIG. 5 represents example device components 500 of the network device 102, 300, 400 and/or the connected terminal 104. The device components 500 comprise a communication bus 502 for interconnecting other device components directly or indirectly. The other device components include one or more communication components 504, one or more processors 506, and one or more memory components 508.

The communication component 504 may be supported by the network device 102 to communicate with the connected terminal 104, and vice versa. For some embodiments, the communication component 504 may utilize wireless technology for communication, such as radio frequency (RF), infrared, microwave, light wave, and acoustic communications. RF communications include, but are not limited to, Bluetooth (including BLE), ultrawide band (UWB), Wi-Fi (including Wi-Fi Direct), Zigbee, cellular, satellite, mesh networks, PAN, WPAN, WAN, near-field communications, and other types of radio communications and their variants. For some embodiments, the communication component 504 may utilize wired technology for communication, such as transmission of data over a physical conduit, e.g., an electrical or optical fiber medium.

The processor or processors 506 may execute code and process data received from other components of the device components 500, such as information received at the communication component 504 or stored at the memory component 508. The code associated with the network device 102 and/or the connected terminal 104 and stored by the memory component 508 may include, but is not limited to, operating systems, applications, modules, drivers, and the like. An operating system includes executable code that controls basic functions, such as interactions among the various components of the device components 500, communication with external devices via the communication component 504, and storage and retrieval of code and data to and from the memory component 508.

Each application includes executable code to provide specific functionality for the processor 506 and/or remaining components. Examples of applications executable by the processor 506 may include, but are not limited to, a port grouping module 510 and/or a BC-TC layers module 512. The port grouping module 510 may configure the network device 102, including the application of a PTP parameter set to each port of the subset of PTP ports associated with a PTP port group. The BC-TC layers module 512 may operate the network device 102 based on the configuration set by the port grouping module 510, including the performance of time exchange for PTP capable devices within a PTP region and/or between PTP regions. The connected terminal 104 may include the port grouping module 510 for those embodiments that utilize a connected terminal. The network device 102 includes the BC-TC layers module 512 and, for some embodiments, may also include the port grouping module 510.

Data stored at the memory component 508 is information that may be referenced and/or manipulated by an operating system or application for performing functions of the network device 102 and/or the connected terminal 104. Examples of data stored by the memory component 508 may include, but are not limited to, port group data 514, parameter set data 516, and BC-TC data 518. The port group data 514 may include one or more PTP port groups associated with a subset of PTP ports of the network device 102 as well as information associating each PTP port group with a corresponding PTP region. The processor 506 receives, directly or indirectly, a PTP parameter set 516 corresponding to the port group data 514. For embodiments that utilize the connected terminal 104, the communication component 504 is configured to receive the PTP parameter set 516 corresponding to the port group data 514 and provide the PTP parameter set to the processor 506. The parameter set data 516 may include one or more parameters such as a domain number, a transport protocol, a path delay mechanism, a PTP profile, a PTP port type, a sync interval, an announce interval, or an announce receipt timeout. The BC-TC data 518 may include data utilized to operate the network device 102, including master-slave communications such as a transmit time of an initial sync message, a receive time of the initial sync message, a transmit time of a delay request, and a receive time of the delay request. The connected terminal 104 may include the port group data 514 and the parameter set data 516 for those embodiments that utilize a connected terminal. The network device 102 includes the BC-TC data 518 and, for some embodiments, may also include the port group data 514 and the parameter set data 516.

The device components 500 of the network device 102 and/or the connected terminal 104 includes one or more input components 520 and one or more output components 522. The input component 520, in particular, is configured to identify a PTP port group associated with a subset of PTP ports of the network device 102 and a PTP region. The input and output components 520, 522 also include ports that are connected to, or otherwise communicating with, PTP capable devices of one or more PTP regions. The input components 520 and output components 522 of the device components 500 may include one or more visual, audio, mechanical, and/or other components. The input and output components 520, 522 may include a user interface 524 for interaction with a user of the device. The user interface 522 may include a combination of hardware and software to provide a user with a desired user experience, such as a display, touchscreen, and/or physical keys. For example, depending on whether a connected terminal 104 is utilized, the communication component 504 and/or the processor 506 receives the parameter set data 516 from the input component 520 of the connected terminal or the network device 102.

It is to be understood that FIG. 5 is provided for illustrative purposes only to represent examples of the device components 500 of the network device 102 and/or connected terminal 104 and is not intended to be a complete diagram of the various components that may be utilized by the system. Therefore, the network device 102 and/or connected terminal 104 may include various other components not shown in FIG. 5, may include a combination of two or more components, or a division of a particular component into two or more separate components, and still be within the scope of the present invention.

Figure 6:
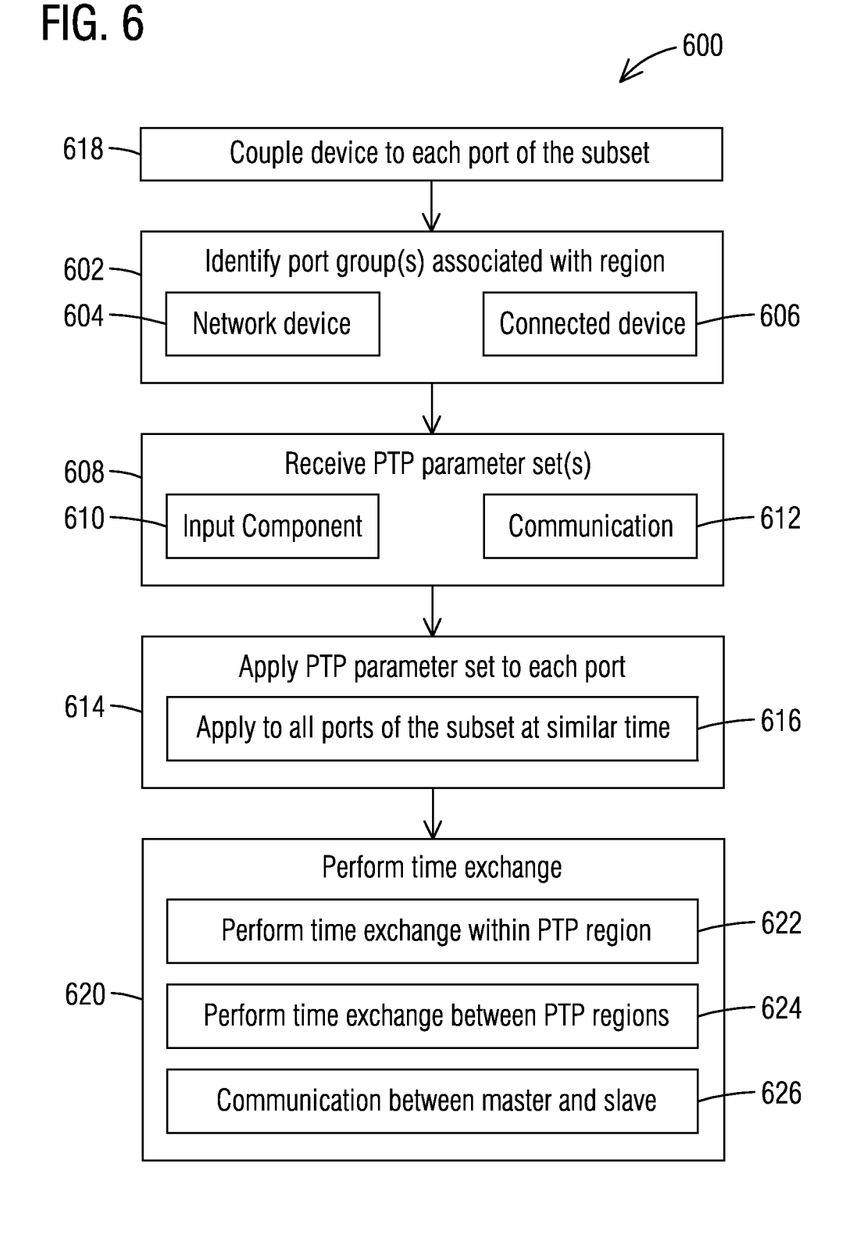
FIG. 6 is a flow diagram depicting an example operation that is operable to employ techniques described herein.

Referring to FIG. 6, there is shown a flow diagram depicting an example operation 600 that is operable to employ techniques described herein. The operation 600 provides a method for configuring multiple PTP ports of a network device. Initially, a PTP port group associated with a subset of PTP ports of the network device is identified (602). The PTP port group is further associated with a PTP region. An input component 520 of the network device 102 (604) or a connected terminal 104 communicating with the network device (606) may be used to identify the PTP port group and otherwise configure the PTP ports. For some embodiments, multiple PTP port groups associated with subsets of the PTP ports of the network device and other PTP regions may be identified (602). For example, in addition to the first group, first subset, and first region, a second PTP port group associated with a second subset of PTP ports and a second PTP region may be identified by the input component 520.

In response to identifying (602) the PTP port groups, a processor 506 of the network device 102 receives (608) a PTP parameter set corresponding to the PTP port group (604). The processor 506 may receive the PTP parameter set from the input component 520 of the network device 102 (610) or the communication component 504 of the network device (612) for an incoming signal from the connected terminal 104. For some embodiments, multiple PTP parameter sets corresponding to the PTP port groups may be received. For example, a second PTP parameter set corresponding to the second PTP port group may be received from the input component 520 or the communication component 504.

In response to receiving the PTP parameter set(s) (608), the processor 506 may apply (614) the PTP parameter set to each port of the subset of PTP ports associated with the PTP port group. For embodiments where multiple PTP parameter sets have been received (608), the multiple PTP parameter sets may be applied (614) to the ports of another subset of the PTP ports associated with the PTP port group. For some embodiments, the PTP parameter applies (616) the PTP parameter set to all PTP ports of the subset of PTP ports at a similar time. For example, the PTP ports may be associated simultaneously with a corresponding PTP parameter set, or the PTP ports may be associated in series within a particular time period with a corresponding PTP parameter set.

At some point before applying the PTP parameter set (614), PTP capable devices are coupled (618) to the PTP ports of the network device 102. For example, the devices may be coupled (618) to the ports before or after identifying (602) the port groups or before or after receiving (608) the PTP parameter set(s).

In response to applying the PTP parameter set(s) (614), the processor 506 performs (620) time exchange for PTP capable devices within (622) the PTP region by utilizing each TC component 406-410 of the transparent clock layer 402. The processor may also perform time exchange for PTP capable devices between (624) the PTP regions by utilizing the BC component 412 of the boundary clock layer 404. For some embodiments, the processor 506 performs time exchange by communicating (626) an initial sync message from a master to a slave, communicating (626) a followup sync message from the master to the slave, communicating (626) a delay request message from the slave to the master, and communicating (626) a final delay response message from the master to the slave. The multiport PTP network device 102 is configured efficiently, minimizing any potential time inaccuracies.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A system for configuring multiple precision time protocol ("PTP") ports of a network device comprising:
    an input component configured to identify a first PTP port group associated with a first subset of PTP ports of the network device and identify a second PTP port group associated with a second subset of PTP ports of the network device, the first PTP port group being further associated with a first PTP region and the second PTP port group being further associated with a second PTP region; and
    a processor configured to receive a first PTP parameter set corresponding to the first PTP port group, receive a second PTP parameter set corresponding to the second PTP port group, apply the first PTP parameter set to each port of the first subset of PTP ports associated with the first PTP port group, apply the second PTP parameter set to each port of the second subset of PTP ports associated with the second PTP port group, perform time exchange for PTP capable devices between the first PTP region and the second PTP region.

2. The system as described in claim 1, wherein:
the input component is supported by a connected terminal or the network device; and
the processor receives the first PTP parameter set from the input component of the connected terminal or the network device.

3. The system as described in claim 1, wherein the first PTP parameter set corresponding to the first PTP port group includes at least one parameter selected from a group consisting of a transport protocol, a path delay mechanism, a PTP port type, an announce interval, or an announce receipt timeout.

4. The system as described in claim 1, wherein a PTP capable device is coupled to each port of the first subset of PTP ports.

5. The system as described in claim 1, wherein the processor applies the first PTP parameter set to all PTP ports of the first subset of PTP ports at a similar time.

6. The system as described in claim 1, wherein the processor determines a transmit time of an initial sync message sent by a master, a receive time of the initial sync message by a slave, a transmit time of a delay request by the slave, and a receive time of the delay request by the master.

7. A method for configuring multiple precision time protocol ("PTP") ports of a network device, the method comprising:
identifying a first PTP port group associated with a first subset of PTP ports of the network device, the first PTP port group being further associated with a first PTP region;
identifying a second PTP port group associated with a second subset of PTP ports of the network device, the second PTP port group being further associated with a second PTP region;
receiving a first PTP parameter set corresponding to the first PTP port group;
receiving a second PTP parameter set corresponding to the second PTP port group;
applying the first PTP parameter set to each port of the first subset of PTP ports associated with the first PTP port group;
applying the second PTP parameter set to each port of the second subset of PTP ports associated with the second PTP port group;
performing time exchange for PTP capable devices between the first PTP region and the second PTP region.

8. The method as described in claim 7, wherein:
identifying the first PTP port group includes identifying the first PTP port group at an input component of a connected terminal or an input component of the network device; and
receiving the first PTP parameter set includes receiving the first PTP parameter set from the input component of the connected terminal or the input component of the network device.

9. The method as described in claim 7, wherein the first PTP parameter set corresponding to the first PTP port group includes at least one parameter selected from a group consisting of a transport protocol, a path delay mechanism, a PTP port type, an announce interval, or an announce receipt timeout.

10. The method as described in claim 7, further comprising coupling a PTP capable device to each port of the first subset of PTP ports.

11. The method as described in claim 7, wherein applying the first PTP parameter set includes applying the first PTP parameter set to all PTP ports of the first subset of PTP ports at a similar time.

12. The method as described in claim 7, wherein performing time exchange comprises:
communicating an initial sync message from a master to a slave;
communicating a followup sync message from the master to the slave
communicating a delay request message from the slave to the master; and
communicating a final delay response message from the master to the slave.

* * * * *